United States Patent [19]

Samokovlitski et al.

[11] Patent Number: 4,605,148
[45] Date of Patent: Aug. 12, 1986

[54] PLANETARY WIRE-FEEDING DEVICE

[75] Inventors: David A. Samokovlitski; Georgi I. Georgiev; Rumen P. Peychev; Sami S. Levi; Lazar O. Petrov, all of Sofia, Bulgaria

[73] Assignee: Insitute po Technicheska Kibernetika iRobotika, Sofia, Bulgaria

[21] Appl. No.: 671,560

[22] Filed: Nov. 15, 1984

[51] Int. Cl.[4] .......................................... B65H 20/00
[52] U.S. Cl. ..................................... 226/174; 226/90; 226/181
[58] Field of Search ................... 226/90, 91, 168, 174, 226/176, 177, 181, 184, 186–188; 414/432

[56] References Cited

U.S. PATENT DOCUMENTS

| | | | |
|---|---|---|---|
| 4,150,772 | 4/1979 | Aver | 226/90 |
| 4,172,545 | 10/1979 | Jones et al. | 226/168 |
| 4,177,912 | 12/1979 | Samokovliski et al. | 226/176 |
| 4,205,771 | 6/1980 | Samokovliski et al. | 226/90 |
| 4,333,594 | 6/1982 | Cloos | 226/176 |

Primary Examiner—Leonard D. Christian

[57] ABSTRACT

Planetary wire-feeding device having a body with a hollow threaded shank. On the body there are two two-arm levers pivotally mounted thereon, the levers having long and short arms. The short arms of the levers are in contact with the outer faces of radially reciprocable pistons which carry wire-feeding rolls. The long arms of the two-arm levers are in contact by means of guiding rolls with a guiding cone which is mounted axially movable along the hollow threaded shank of the body. The internal side of the guiding cone is in contact with one end of a coil compression spring which embraces the hollow threaded shank. The other end of the spring is in contact with an adjustable abutment or calibrating its compressive force. The device of the invention allows a variable calibration of the pushing force as required, changing in the diameter, type of material, etc. An electrode wire, while preserving the automatic setting of the pushing forth of the coil compression spring for a given diameter, type of material, etc., is the electrode wire being fed by the wire-feeding device.

6 Claims, 4 Drawing Figures

PLANETARY WIRE-FEEDING DEVICE

This invention relates to a planetary wire-feeding device which is used for feeding steel, aluminium and tubular electrode wire for welding.

A known planetary wire-feeding device disclosed in Bulgarian Authors Certificate No. 23 278, comprises a body with a hollow threaded shank. In the housing there are machined grooves in which there are disposed two two-arm levers, fastened hingedly by means of axles. The short arms of the two-armed levers are in contact with the face of pistons, arranged opposite one another and radially to the axis of the electrode wire. The pistons carry wire-feeding rolls, and are disposed in wholes formed in the body. The long arms of the two-arm levers are in contact, by means of guiding rolls, with a guiding cone mounted axially movable on the hollow threaded shank of the body. The internal side of the guiding cone is in contact with one end of a spiral pre-calibrated compression spring, which embraces the hollow threaded shank. The other end of the spring is in contact with the periphery of the body. The device allows the feeding of electrode wire of a given diameter, type, or material, with a constant calibrated pushing force, resulting from the precalibrated spring mounted in the body of the device.

A drawback of the above described known device is that it is necessary, in the case of any change of the diameter of the electrode wire to be fed, its type or material, to replace the spring by another spring, especially calibrated for this diameter, type or material of the electrode wire to be fed. Moreover, the production of a predetermined pushing force is related to an increase of the requirements of the technology of producing the spring as a component, as well as to the accuracy of manufacture of the device as a whole. The necessity of replacement of the spring adds to the labors of the attending personel and requires that such personel have a higher qualification then would otherwise be neccessary, reduces the productivity of the apparatus, increases its complexity and hence, increases the prime cost.

It is therefore a general object of this invention to provide a planetary wire-feeding device which allows the setting of the pushing force for a given diameter, type or material of the electrode wire without the need of replacing the calibrated spring. This results in a reduction of the complexity, of the apparatus, facilitation of the task of attending the apparatus, and increases in the productivity of the apparatus and a reduction of its prime cost.

The above objects are achieved by a planetary wire-feeding device in accordance with the invention. Such device comprises a body with a hollow threaded shank. In the body there are machined grooves, in which are disposed two two-arm levers, fastened hingedly to the body means of stub shafts or axles. The short arms of the levers are in contact with the faces of pistons which carry wire-feeding rolls. The pistons are arranged radially of the axis for the electrode wire being fed by the apparatus, and are disposed in a circular cylindrical whole machined in the body. The long arms of the two-armed levers are in contact, by means of guiding rolls, with a guiding cone, which is mounted axially movable along the hollow threaded shank of the body. The internal side of the guiding cone is in contact with the one end of a coil compression spring, which embraces the hollow threaded shank. According to the invention, the other end of the spring is in contact with an adjustable abutment device for calibrating its compressive force. Such calibrating device is a U-shaped member mounted axially movable along the hollow threaded shank, and in grooves machined in the body of the device. The face of the U-shaped member are in contact with the heads of two regulating screws which are screwed into the body and whose axes are parallel to the axis of the electrode wire being fed.

The advantages of the invention lie in that, while preserving the automatic setting of the pushing force of the coil compression spring for a given diameter, type or material of the electrode wire of the wire-feeding device, it allows a variable calibration of the pushing force as required by changing in the diameter, type or material in the electrode wire. This makes the device universal, reducing its complexity and prime cost, and facilitates its service and attendance.

For a better understanding of the invention, reference should be made to the accompanying drawings in which there is illustrated and described a preferred embodiment of the invention:

Figure 2:
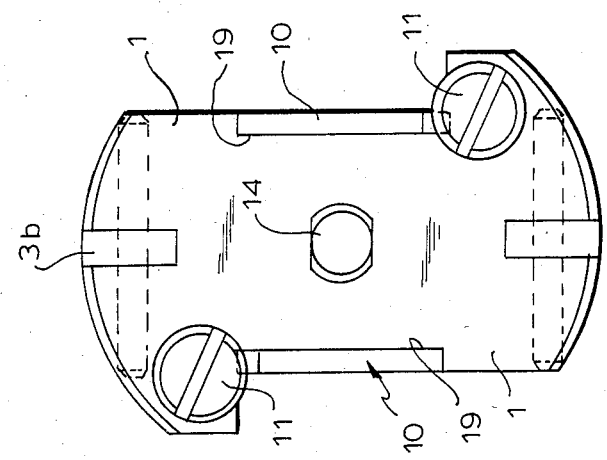
FIG. 2 is a view in end elevation of the wire-feeding device, such view being taken from the left looking toward the right in FIG. 1.
Figure 1:
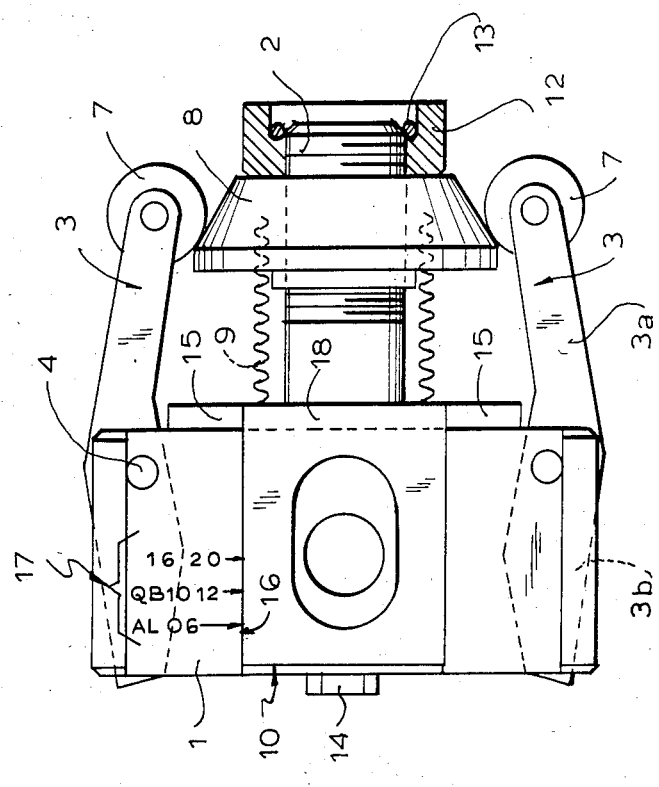
FIG. 1 is a view in side elevation of the wire-feeding device.
Figure 4:
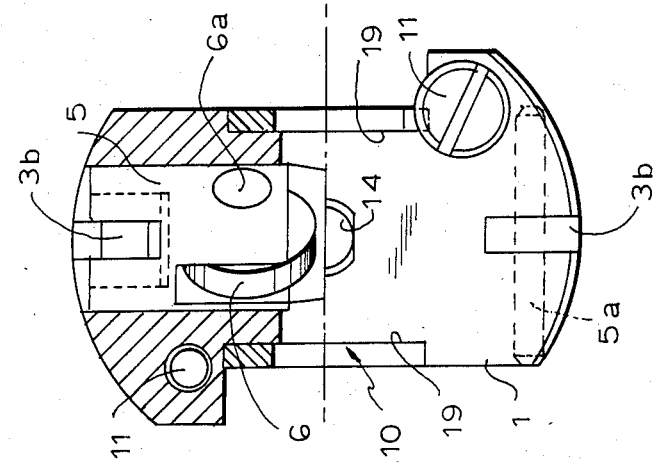
Figure 3:
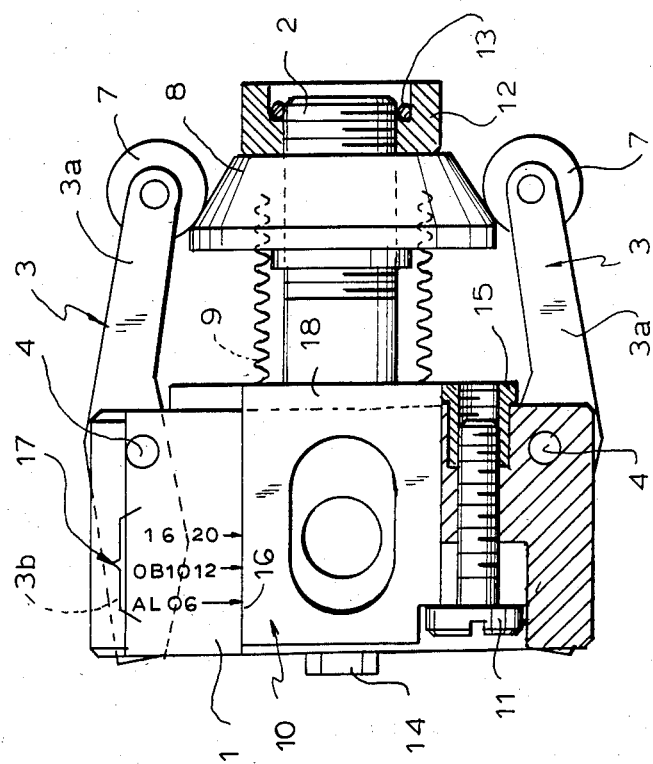

FIG. 3 in a view which is similar in its upper portion to the upper portion of FIG. 1, but the lower portion of the figure being shown in vertical axial section; and FIG. 4 is a view, partially in end elevtion and partially in vertical transverse section of the device, the lower portion of FIG. 4 appearing in a manner similar to the lower portion of FIG. 2, the upper portion of FIG. 4 being shown in transverse vertical section.

The wire-feeding device comprises a body 1 with a hollow threaded axially extending shank 2, by means of which the device is attached to a driving electric motor (not shown). In the body 1 there are machined oppositely extending grooves in each of which there is disposed a two-armed first-class lever 3, fastened to body 1 a pivot pin or stub shaft 4. The short arms 3b of the two-arm levers 3 are in contact with the radially outer faces of respective pistons 5; pistons 5 carry wire-feeding rolls 6 which are skew-mounted thereon. The pistons 5 are arranged radially of the electrode wire (not shown) which travels axially centrally through the body 1 of the device. The electrode wire is guided by guiding means, of which one is shown at 14. The body 1 has a transverse circular cylindrical passage 20 therethrough.

The long arms 3a of the two-armed levers 3 carry guide roll 7 rotatably mounted thereon, roll 7 being in engagement with the outer surface of a guiding cone 8 which is mounted on the threaded shank 2 for movement axially there along. The internal side, that is the side thereof adjacent to its larger diameter, of the guiding cone 8 is in contact with one end of a coil compression spring 9, which embraces the hollow threaded shank 1. The other end of the spring 9 is in contact with a device for calibrating the force which the spring 9, acting through the levers 3 and pistons 5, exerts upon the feeding rolls 6.

The device for adjusting the effective compressive force of spring 9 is composed of a U-shaped member 10, which is mounted for axial movement with respect to the hollow threaded shank 2, and the opposite parallel legs of member 10 being mounted in and guided by in grooves 19 machined in the body 1. The opposite legs of member 10 has aligned oval-shaped holes 19 therethrough. The cross portion or root 18 of the U-shaped member has a central hole therein through which the threaded shank 2 freely extends. The U-shaped member 10 is adjusted axially of the body 1 of the device, so that portion 18 thereof variably compresses the spring 9. Such adjustment is effected by means of two diagonally oppositely mounted adjusting screws 11 having enlarged heads which engage into notches in the outer ends of the respective legs 10 of the U-shaped member. The axes of the regulating screws 11 are disposed parallel to the axis of the electrode wire, that is, parallel to the longitudinal central axis of the body 1. As shown in FIG. 3, the inner threaded ends of the adjusting screws 11 are screwed into internally threaded bushings 15 which are mounted in respective bores in the body 1 of the device.

In order that the spring 9 may be adjusted to known compressive values, cooperating means mounted upon the U-shaped member 10 and upon the body 1 so that the relative position of these two members, and thus the degree of compression of the spring 9, will be readily apparent. An index mark or indicium 16 is provided on the body 1, one such mark being shown in FIG. 3. Cooperating with each index mark 16 are a number of calibration marks, designated at 17 as a whole, on each leg of the U-shaped member 10.

A nut is screwed on over the right-hand end of the hollow threaded shank 2, the nut 12 being protected against self-unscrewing by a locking ring 13.

The above described apparatus of the invention operates as follows:

The attending worker displaces the U-shaped member 10 with respect to the body 1 by means of the screws 11 until a desired vernier mark or indicium on the U-shaped member coicides with the index mark 16 on the body 1. This ensures that the U-shaped member is correctly positioned to correspond with the desired value of compressing of the spring 9 with regard to the diameter and material of the electrode wire which is to be fed by the feeding device. By displacing the U-shaped member 10, it is possible to increase or decrease the force with which the spring 9 acts upon the guiding cone 8, and respectively, via the two-arm levers 3 and the pistons 5—on the pressure exerted by the wire-feeding roll 6 on the electrode wire being fed.

For introducing the electrode wire in the device, it is necessary to screw the nut 12 onto the threaded shank 2 so as to cause a displacement of the guiding cone 8 to the left (FIGS. 1 and 3). It becomes possible to move the pistons 5 with the wire-feeding rolls 6 away from each other, so that the electrode wire being which is to be fed can pass between them. Then again, the nut 12 is unscrewed until it touches the locking ring 13. Under the action of spring 9, the guiding cone 8 moves to the right and to rates the two-arm levers 3 and, respectively, presses the pistons 5 with the wire-feeding rolls 6 against the electrode wire. After this has been done, regardless of the diameter of the electrode wire being fed, there always exists a predetermined clearance between the face of the guiding cone 8 and the face of the nut 12.

Although the invention is described and illustrated with reference to a single of embodiment thereof, it is to be expressly understood that it is in no way limited to the disclosure of such preferred embodiment but is capable of numerous modifications within the scope of the appended claims.

We claim:

1. A planetary wire-feeding device, comprising a body, two oppositely disposed similar first-class levers pivotally mounted on the body, the levers each having a first and a second arm, the first arms of the levers being in contact with the faces of pistons which carry skewed wire-feeding rolls arranged on the body opposite one another and radially with respect to the axis of an electrode wire traveling axially through the body of the device, a guiding cone on the body, the second arms of the levers being in thrusting relationship with the guiding cone, the cone being mounted axially movably within the body, a coil compression spring disposed on the body coaxially therewith, the larger diameter end of the guiding cone being in contact with one end of the coil compression spring, the other end of the spring being in contact with an adjustable abutment means on the body of the device for calibrating the force which the spring exerts upon the cone, whereby to adjusting the force which the feeding rolls exert upon the wire being fed thereby.

2. A device according to claim 1, comprising a tube disposed axially within the body, the wire traveling axially within the tube as it is fed by the device, and wherein the guiding cone is mounted upon said tube in axial alignment therewith.

3. A device according to claim 2, wherein the adjustable abutment means for adjusting the force which the spring exerts upon the cone, comprises a U-shaped member having a hole through the base of the U-shaped membeer, the tube extending through said hole in the base of the U-shaped member, the said other end of the spring being in contact with the base of the U-shaped member, and means for adjusting the U-shaped member axially of the body of the device.

4. A device according to claim 3 comprising grooves in the opposite sides of the body of the device, said grooves slidingly receiving the opposite parallel legs of the U-shaped member, whereby the U-shaped members is accurately guided for axial movement with respect to the body of the device.

5. A device according to claim 4 earn the means for adjusting the U-shaped member comprises two oppositely disposed regulating screws which are screwed into the body of the device, said screws having heads which overlie respective end portions of the legs of the U-shaped member whereby adjustably to advance the U-shaped member against the action of the spring or to retract the U-shaped member in the direction of the force exerted upon it by the spring.

6. A device according to claim 1, wherein the second arms of the levers are longer than the first arms thereof.

* * * * *